Figures 1, 2, 3:
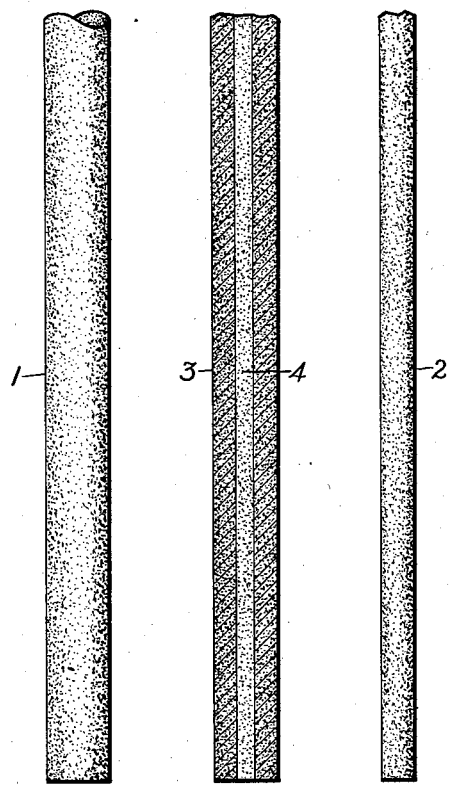

No. 859,889. PATENTED JULY 9, 1907.
R. H. READ.
ARC LIGHT ELECTRODE.
APPLICATION FILED OCT. 10, 1902.

Witnesses.
George H. Tilden
Helen Orford

Inventor.
Robert H. Read.
by Albert G. Davis
Att'y.

UNITED STATES PATENT OFFICE.

ROBERT H. READ, OF SCHENECTADY, NEW YORK, ASSIGNOR TO GENERAL ELECTRIC COMPANY, A CORPORATION OF NEW YORK.

ARC-LIGHT ELECTRODE.

No. 859,889.　　　　　Specification of Letters Patent.　　　Patented July 9, 1907.

Original application filed May 18, 1901, Serial No. 60,813. Divided and this application filed October 10, 1902.
Serial No. 126,669.

*To all whom it may concern:*

Be it known that I, ROBERT H. READ, a citizen of the United States, residing at Schenectady, in the county of Schenectady, State of New York, have invented certain new and useful Improvements in Arc-Light Electrodes, of which the following is a specification.

This invention relates to arc lighting, the object being to improve the quality of the light and permit the maintenance of a longer arc with currents of moderate potential and amperage.

I have discovered that conducting electrodes for arc lamps formed of or containing a considerable proportion of the conducting carbids permit a longer arc to be drawn for the same potential and current than corresponding electrodes of carbon, and produce a smoother action at the arc, the tendency of the tips at the arc terminals being to fuse before vaporization, thus conducing toward a quiet action free from hissing or decrepitation, and much more steady than a carbon arc. The color of the arc varies with the base of the carbid, for example, an arc containing carbid of calcium has a rich golden color of great luminosity, while one formed of or containing aluminium carbid has a much whiter appearance, the spectrum varying with the nature of the carbid.

I prefer to employ carbids which are unaffected by moisture and therefore do not deteriorate in service when exposed to the atmosphere.

In my original application, Serial Number 60,813, of which the present application is a division, I describe various carbids which might be employed. My present application is restricted to the use of titanium carbid or a compound containing the same, as an arc light electrode. It yields eminently satisfactory results in arc lighting, giving a light of extraordinary efficiency, the arc obtained being flaming or luminous and of a very good white color. It may be employed pure or mixed with a carbonizable binder molded and baked. It may also be used for a cored carbon, but in each case it is the preponderance of the titanium lines in the spectrum that gives to the arc its peculiar characteristics and its great efficiency. In preparing the electrodes of this material, the titanium carbid may be finely pulverized and molded in sticks of the desired size by mixing it with a carbonizable binder, such as cane sugar or wheat flour moistened with coal tar or even cold water. After drying and baking at a bright red heat its structure may be rendered more compact and dense by filling the pores with carbon by any approved process, such for example as saturating with sugar and again firing, or by raising to a red heat in a hydrocarbon vapor. I find that an arc lamp provided with electrodes of such material gives a more efficient light than a carbon arc. The fusion of the carbid conduces to steadiness and renders the arc more tenacious than a carbon arc. The electrodes are inherently slow burning even in the open air. The oxid or other vapors developed in burning may if desired be trapped in an inclosing globe, and the lamp may be provided with a wiper periodically operated to remove the deposit from the walls of the globe, or a draft may be provided through the inclosing globe to prevent a deposit.

When burning in an automatic lamp it is desirable to provide special means for starting the arc as the deposit of oxid formed at the electrode terminal is a poor conductor. Various methods may be employed to start the flow of current to strike the arc. The admixture of the carbid with the carbon tends to reduce this difficulty.

In the accompanying drawings, Figures 1 and 2 illustrate elevations of arc light pencils of different sizes formed according to my invention; Fig. 3 shows a cored electrode.

The electrodes shown in Figs. 1 and 2 respectively are designed for lamps carrying different currents. In the type shown in Fig. 3 a hollow carbon pencil 3 is filled with a core of conducting carbid compound, as above described.

This application is a division of my pending application Serial Number 60,813, filed May 18, 1901.

What I claim as new and desire to secure by Letters Patent of the United States is,

1. An arc light electrode formed of carbid of titanium.
2. An arc light electrode containing carbid of titanium.
3. An arc light electrode containing carbid of titanium having its pores filled with an electric conductor.
4. An arc light electrode formed of carbid of titanium having its pores filled with carbon.
5. An arc light electrode containing a predominating amount of titanic material.
6. An arc light electrode conducting at ordinary temperatures, containing a predominating amount of titanic material.
7. An arc light electrode, conducting at ordinary temperatures, composed of titanium compound.
8. An arc light electrode composed of material containing titanic material in such amount that the titanium lines in the spectrum of the arc insure the emission of a substantially white light.
9. An arc light electrode conducting at ordinary temperatures, and composed essentially of a titanium compound.
10. An arc light electrode composed of refractory conducting material of which titanium forms one of the principal constituents.
11. An arc light electrode, conducting at ordinary temperatures, and formed of material of which titanium is one of the principal constituents.

In witness whereof I have hereunto set my hand this 8th day of October, 1902.

ROBERT H. READ.

Witnesses:
BENJAMIN B. HULL,
HELEN ORFORD.